(12) United States Patent
Krämer et al.

(10) Patent No.: US 6,308,774 B1
(45) Date of Patent: Oct. 30, 2001

(54) METHOD FOR THE CLEANING OF HEAT EXCHANGE TUBES AND COLLECTING DEVICE FOR THE COLLECTION OF DEPOSITS FROM HEAT EXCHANGE TUBES

(75) Inventors: Georg Krämer, Wiesenttal; Franz Ammann, Erlangen, both of (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/377,608

(22) Filed: Aug. 19, 1999

(30) Foreign Application Priority Data

Aug. 19, 1998 (DE) .............................................. 198 37 683

(51) Int. Cl.⁷ ...................................................... F28G 1/02
(52) U.S. Cl. .............................. 165/95; 15/304; 122/379; 134/21; 134/22.11; 134/166 C
(58) Field of Search ................................ 165/95; 15/304, 15/345; 134/166 C, 22.11, 21; 122/379

(56) References Cited

U.S. PATENT DOCUMENTS

| | | | |
|---|---|---|---|
| 3,895,465 | * | 7/1975 | Korn et al. ........................ 165/95 X |
| 4,438,805 | | 3/1984 | Gugel . |
| 4,653,578 | * | 3/1987 | Horning ............................ 165/95 X |
| 4,670,062 | * | 6/1987 | Lester .................................... 134/21 |
| 4,820,496 | * | 4/1989 | Sapoff ......................... 134/166 C X |

\* cited by examiner

Primary Examiner—Leonard Leo
(74) Attorney, Agent, or Firm—Herbert L. Lerner; Laurence A. Greenberg; Werner H. Stemer

(57) ABSTRACT

A method for the cleaning of heat exchange tubes and a collecting device for the collection of deposits from heat exchange tubes, include releasing deposits and collecting the deposits with a collecting vessel. The collecting vessel has an inlet orifice that completely encloses the underside of a tube plate in which exit-side tube ends are disposed. The collecting vessel has an inflatable hose for sealing off the collecting vessel. The collecting vessel is capable of being folded together, so that it can be introduced through a service orifice into the heat exchanger. The collecting vessel provides simple handling and positioning and serves, in particular, for use in a nuclear plant.

43 Claims, 2 Drawing Sheets

METHOD FOR THE CLEANING OF HEAT EXCHANGE TUBES AND COLLECTING DEVICE FOR THE COLLECTION OF DEPOSITS FROM HEAT EXCHANGE TUBES

BACKGROUND OF THE INVENTION

Field of the Invention

The invention relates to a method for the cleaning of heat exchange tubes which are led through a tube plate of a heat exchanger, in particular of a heat exchanger of a nuclear plant, in which deposits in the heat exchange tubes are released and conveyed to a respective tube end. The invention also relates to a collecting device for the collection of deposits from heat exchange tubes led through a tube plate of a heat exchanger, in particular a heat exchanger of a nuclear plant.

When a heat exchanger is in operation, deposits may form in the heat exchange tubes. The deposits reduce the thermal conductivity of the heat exchange tubes and therefore the efficiency of the heat exchanger. In addition, the deposits make it difficult to check the heat exchange tubes for possible damage. That is because, for example, test heads are introduced into the heat exchange tubes for checking purposes. In that case, the measurement signals determined by the test heads may be influenced greatly by the deposits, so that it is only possible to obtain evidence as to the state of the heat exchange tubes to a limited extent.

It is necessary to check the heat exchange tubes for safety reasons, particularly in the case of a heat exchanger used in a nuclear plant. In a heat exchanger of that type, the deposits may be contaminated radioactively. Manual cleaning, in which the operating personnel would be directly exposed to the radioactive materials, is therefore usually disregarded. The aim is to carry out the cleaning of the heat exchange tubes as automatically as possible with the aid of manipulators.

Different methods may be employed in order to clean the heat exchange tubes. For example, they may be cleaned mechanically with the aid of a brush which is led through each heat exchange tube. The deposits may also be released and removed chemically or with the aid of abrasive blasting agents through the use of a blasting method.

A blasting method, in which the heat exchange tubes are first dried and subsequently treated with a compressed air/blasting agent mixture, is described in German Published, Non-Prosecuted Patent Application DE 195 46 788 A1, corresponding to U.S. Pat. No. 5,883,512. Through the use of that cleaning method, the heat exchange tubes are prepared for eddy current integrity testing, in order to improve fault detection during such a test.

Particularly in the case of a heat exchanger used in a nuclear plant, a situation must be avoided in which the released deposits and, possibly, abrasive blasting agents enter the heat exchanger and pass from there into other parts of the nuclear plant and influence its operation. It is therefore necessary for the released deposits and the abrasive blasting agents to be removed from the heat exchanger completely.

SUMMARY OF THE INVENTION

It is accordingly an object of the invention to provide a method for the cleaning of heat exchange tubes and a collecting device for the collection of deposits from heat exchange tubes, which overcome the hereinafore-mentioned disadvantages of the heretofore-known methods and devices of this general type, in which the method provides simple measures to ensure that released deposits are collected and time spent in carrying out the method is as short as possible and in which the collecting device is simple to handle and ensures that the released deposits from the heat exchange tubes are collected, so that complete removal from the heat exchanger is possible.

With the foregoing and other objects in view there is provided, in accordance with the invention, a method for cleaning heat exchange tubes led through a tube plate of a heat exchanger, in particular a heat exchanger of a nuclear plant, which comprises mounting a common collecting vessel on the tube plate from below in the vicinity of the heat exchange tubes; releasing deposits in the heat exchange tubes and conveying the deposits to respective tube ends of the heat exchange tubes; and collecting the deposits from a plurality of the heat exchange tubes in the collecting vessel, without the collecting vessel changing position.

The essential advantage of the method is that the collecting vessel encloses a plurality of tube ends at the same time with its inlet orifice and, when these tubes are being cleaned, does not need to be moved from one tube end to the other. Due to the large number of heat exchange tubes in a heat exchanger, it is therefore not necessary to position the collecting vessel exactly at the tube end of the heat exchange tube which is to be cleaned. Therefore, in an automatic cleaning method, in which the heat exchange tubes are cleaned, for example through a manipulator, a complicated control for positioning the collecting vessel at the respective tube end of the heat exchange tube to be cleaned is dispensed with.

In accordance with another mode of the invention, the collecting vessel is introduced through a service orifice into the heat exchanger and is deployed there to a desired size and shape. Since the service orifice is usually very small, as compared with the area of the tube plate, what can be achieved thereby is that a very large region of the tube plate can be covered by the collecting vessel, despite a relatively small service orifice.

In accordance with a further mode of the invention, in order to ensure that the released deposits are collected completely by the collecting vessel, the collecting vessel is sealed off relative to the surroundings. In particular, its inlet orifice is sealed off, so that the released deposits pass completely into the collecting vessel.

In accordance with an added mode of the invention, in order to position the collecting vessel as simply as possible, the inlet orifice of the collecting vessel extends in one half space, in the region of the tube plate, over the entire underside of the tube plate which is present there.

As a rule, the region below the tube plate in a heat exchanger is divided into two half spaces. In this case, a heat exchanging medium flows through the first half space into the entry-side tube ends disposed in this half space. The medium subsequently flows out of the exit-side tube ends of the heat exchange tubes in the second half space. The inlet orifice therefore surrounds the exit-side tube ends of all of the heat exchange tubes simultaneously. The collecting vessel therefore only has to be mounted once on the underside of the tube plate, and individual suction extraction from the exit-side tube ends is not necessary.

In accordance with an additional mode of the invention, the inlet orifice is adapted, at least in a partial region, to a predetermined geometry, in particular to the geometry of the half space in the region of the tube plate, by the inflation of a hose, and at the same time is sealed off relative to the environment.

The inflatable hose ensures sealing off relative to the surroundings in a very simple and elegant way, specifically essentially irrespective of the geometry of the region to be sealed off. This is because the initially uninflated hose only needs to be attached approximately to the edge of the region to be sealed off. It is adapted automatically to the geometry and also seals off roundings without difficulty by being inflated. Moreover, handling is very simple, since the hose, when folded together, can easily be introduced into the heat exchanger through the service orifice.

Alternatively to sealing off through the use of the hose, an elastic material or spring elements such as, for example, helical annular springs made of metal or plastic, may also be used.

In accordance with yet another mode of the invention, the collecting vessel is positioned automatically with the aid of a positioning device, so that the collecting vessel is mounted even before the actual cleaning operation, without manual intervention of the operating personnel within the heat exchanger being necessary.

In accordance with yet a further mode of the invention, the released deposits are suction-extracted from the collecting vessel. A vacuum is thereby generated in the collecting vessel relative to the surroundings. On one hand, the released deposits from the heat exchange tubes are sucked into the collecting vessel. On the other hand, due to the vacuum, air flows into the collecting vessel from outside at leaky points at which the collecting vessel and, in particular, its inlet orifice are inadequately sealed off relative to the surroundings. This ensures that the released deposits can in no way pass outward into the surroundings of the collecting vessel.

With the objects of the invention in view there is also provided, in a heat exchanger including a tube plate and heat exchange tubes led through the tube plate and having tube ends, in particular a heat exchanger of a nuclear plant, a collecting device for collecting deposits from the heat exchange tubes, the collecting device comprising a collecting vessel to be mounted, in particular fastened, on the tube plate or in a region below the tube plate, the collecting vessel having an inlet orifice simultaneously enclosing a plurality of the tube ends.

In accordance with another feature of the invention, the collecting vessel is constructed in the form of a funnel, that is to say the collecting vessel tapers downward from its inlet orifice to its opposite end. The collecting vessel has a conical, conoidal or frustoconical structure. Due to the oblique walls or side walls of the collecting vessel, the deposits from the heat exchange tubes, which pass through the inlet orifice into the collecting vessel, slip automatically to the lower end of the collecting vessel. In accordance with a further feature of the invention, there is provided a suction extraction device located there.

In accordance with an added feature of the invention, the collecting vessel is constructed so as to be capable of being folded together, so that the collecting vessel can be introduced through a small service orifice into the heat exchanger. For this purpose, the collecting vessel has, for example, a number of side walls which are disposed one upon the other, in each case through an elastic connection, and which are formed of metal, plastic or a flexible material. The elastic connections are, for example, also hinges.

In accordance with an additional feature of the invention, for the purpose of simple handling, the collecting vessel is formed at least partially of a flexible material. It may, of course, also be constructed completely from a flexible material. It is possible, for example, to use a thin-walled flexible metal sheet, a flexible plastic film or plate, a rubber mat or a textile fabric (for example, a canvas cloth) as a flexible or elastic material. If the heat exchange tubes are cleaned through the use of a blasting method, in which abrasive blasting agents are used, the flexible material must be selected in such a way that it remains largely undamaged by the abrasive blasting agents or by the released deposits.

The space conditions in the heat exchanger in the region below the tube plate often make it necessary to construct the side walls so as to run at a very low inclination, because of a low height.

In accordance with yet another feature of the invention, there is provided a shaking device, by which the side walls of the collecting vessel are shaken and set in vibration, so that the deposits do not stick to the side walls and/or are released. The shaking device prevents the collecting vessel from being clogged.

In accordance with yet a further feature of the invention, the collecting vessel is fastened to the tube plate from below at only a few points at which a holding device is provided in each case, so that fastening can take place very quickly.

In accordance with yet an added feature of the invention, there are provided clamps that serve as a holding device and which are disposed in the region of the underside of the tube plate. The collecting vessel is fastened to the tube plate with the aid of these clamps.

In accordance with yet an additional feature of the invention, the edge of the inlet orifice of the collecting vessel is formed, in particular, by an inflatable hose which, in order to fasten the collecting vessel, is inserted into the clamps and is subsequently clamped firmly by being inflated.

In accordance with again another feature of the invention, the collecting vessel is fastened and sealingly closed off relative to the surroundings.

In accordance with again a further feature of the invention, there is provided a positioning device for positioning the collecting vessel.

In accordance with again an added feature of the invention, there is provided a manipulator for releasing the deposits.

With the objects of the invention in view, there is additionally provided, in a heat exchanger having heat exchange tubes, a collecting vessel for collecting deposits from the heat exchange tubes, comprising a conical and foldable structure having an inlet orifice, and an inflatable hose running preferably entirely around an edge of the inlet orifice.

This embodiment of the collecting vessel can be combined unrestrictedly with the collecting device described above and the advantageous refinements of the latter.

Other features which are considered as characteristic for the invention are set forth in the appended claims.

Although the invention is illustrated and described herein as embodied in a method for the cleaning of heat exchange tubes and a collecting device for the collection of deposits from heat exchange tubes, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
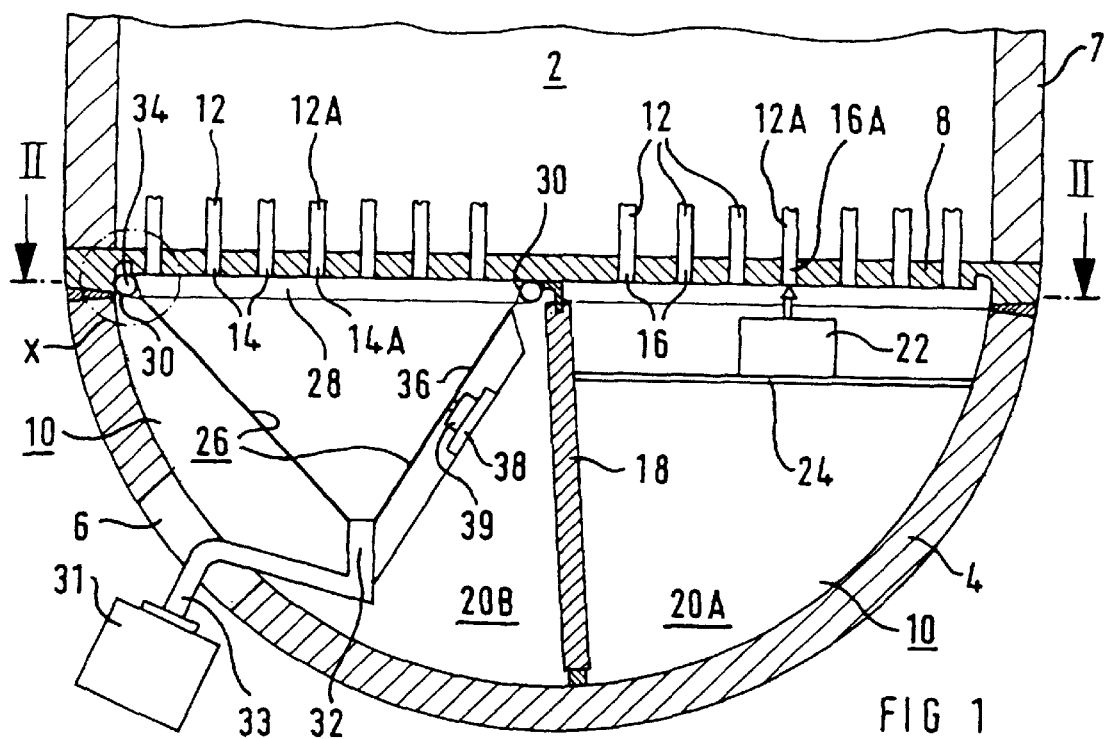
FIG. 1 is a fragmentary, diagrammatic, longitudinal-sectional view of a heat exchanger in the vicinity of its tube plate.

Referring now to the figures of the drawings in detail and first, particularly, to FIG. 1 thereof, there is seen a portion of a heat exchanger 2 of a nuclear power station having a lower end with a bottom 4 that is semicircular in section and in which a manhole or a service orifice 6 is provided. The heat exchanger 2 has a cylindrical middle part 7 above the bottom 4. A tube plate 8 running essentially horizontally is disposed in the vicinity of a transition between the cylindrical middle part 7 and the bottom 4. This tube plate 8 extends completely over a lower space 10 spanned by the semicircular bottom 4. Heat exchange tubes 12, only a few of which are illustrated, are disposed vertically on the tube plate 8. The heat exchange tubes 12 have exit-side tube ends 14 and entry-side tube ends 16 which terminate in each case on or in the tube plate 8. The heat exchange tubes run through the cylindrical middle part 7, for example in a U-shaped manner.

The space 10 below the tube plate 8 is subdivided into two half spaces 20A, 20B by a separating device 18, for example a separating plate. When the heat exchanger 2 is operated normally, the half space 20A serves, for example, as an inflow space and the half space 20B as an outflow space for a heat exchange medium. The heat exchange medium flows initially through the entry-side tube ends 16 disposed in the (right) half space 20A, into the heat exchange tubes 12, and leaves the heat exchange tubes 12 through the exit-side tube ends 14 which all open into the second (left) half space 20B.

A diagrammatically illustrated manipulator 22, which is disposed in the half space 20A, is used in the present case for cleaning the heat exchange tubes 12. For this purpose, the manipulator 22 is first moved over a guide 24 up to the mouth of a selected heat exchange tube 12A to be cleaned. In order to release deposits, for example, a brush is then moved by the manipulator 22 into the respective heat exchange tube 12A or, for example, a blasting agent is blown from the manipulator 22 through the respective heat exchange tube 12A. This is carried out in succession in all of the heat exchange tubes 12, without a collecting vessel 26 having to be displaced. At the same time, the deposits in the heat exchange tube 12A which is treated in each case are released and conveyed to a corresponding exit-side tube end 14A. The deposits emerge from the heat exchange tube 12A at the exit-side tube end 14A. The released deposits are collected there, in order to avoid contaminating the space 20B of the heat exchanger 2, and are discharged.

A collecting device which would be constructed solely for an individual heat exchange tube 12A, for example in the form of a remotely controllable manipulator, would require a complicated control in order to be positioned at the precise heat exchange tube 12A to be cleaned. The common collecting vessel 26 is provided according to FIG. 1 in order to avoid this outlay. The common collecting vessel 26 extends preferably over the entire area of the tube plate 8 in the half space 20B, so that all of the tube ends 14 opening into this half space 20B are enclosed completely by an inlet orifice 28 of the collecting vessel 26. There is accordingly no need for complicated positioning.

The collecting vessel 26 is fastened along an edge, in the vicinity of the tube plate 8, through the use of several holding devices 30, only two of which are illustrated in FIG. 1. The holding devices 30 may be disposed either directly on the underside of the tube plate 8 or else on the bottom 4 or side walls of the heat exchanger 2 in the vicinity of the underside.

Figure 2:
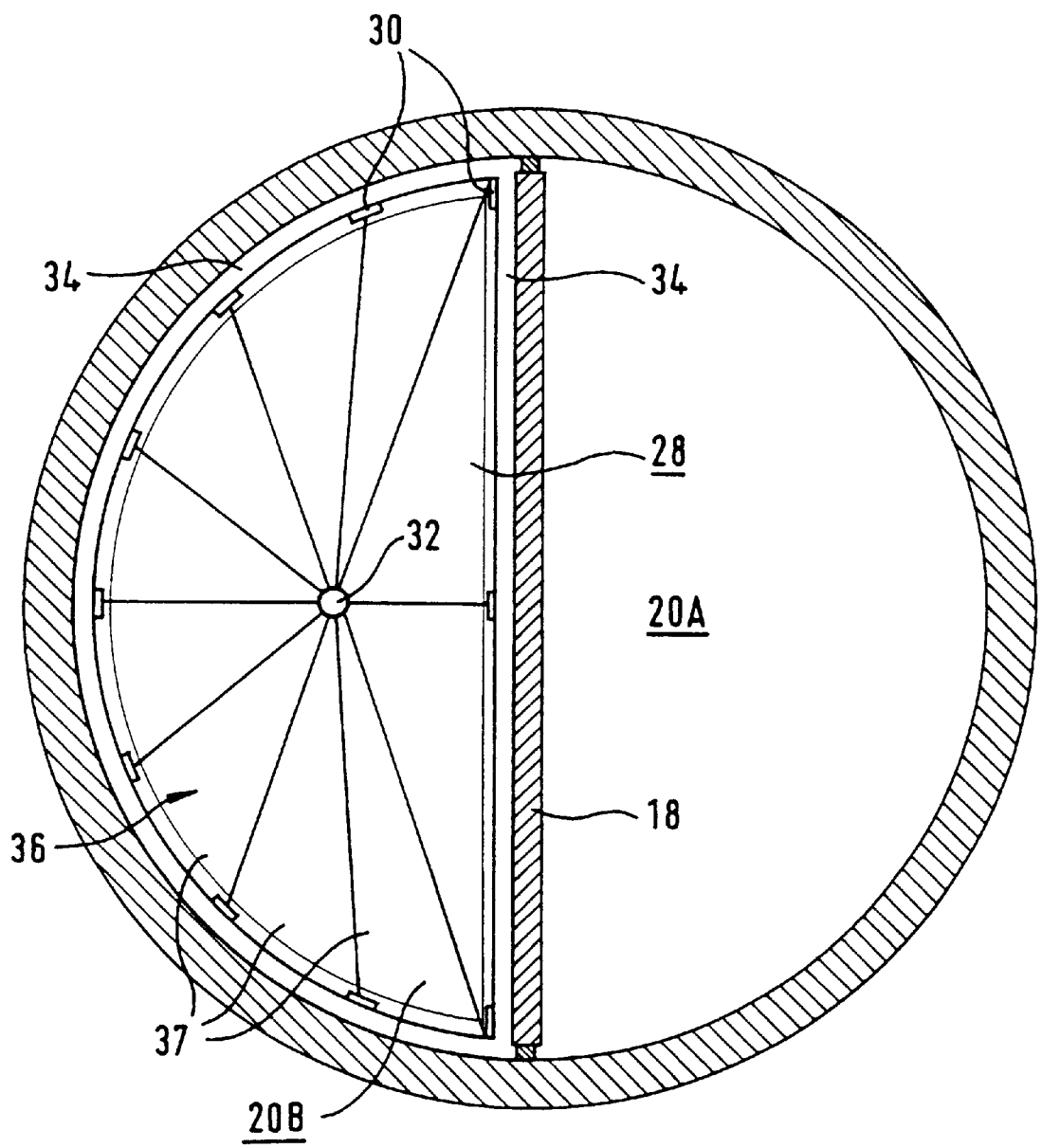
FIG. 2 is a cross-sectional view of the heat exchanger taken along a line II—II of FIG. 1, in the direction of the arrows, showing a region below the tube plate.

The collecting vessel 26 tapers downward from the tube plate 8. In particular, the collecting vessel 26 has a conical or funnel-shaped construction and a wall 36 which therefore runs obliquely downward. The wall 36 is composed, for example, of interconnected triangular side parts 37 which surround an approximately semiconoidal space in a deployed state, as is seen in FIG. 2. A suction extraction orifice 32 is disposed at a lower end of the collecting vessel 26, that is to say in the vicinity of a cone tip or funnel tip. The orifice 32 is connected, through a line 33 led outward through the service orifice 6, to a diagrammatically illustrated suction extraction device 31, for example a pump or a vacuum system. The deposits collected by the collecting vessel 26 are suction-extracted through the suction extraction orifice 32 and removed from the heat exchanger 2.

The collecting vessel 26, when in the mounted state, is sealed off relative to the surroundings. For this purpose, it is sealingly fastened, at its inlet orifice 28, in the vicinity of the tube plate 8, by at least one sealing element. Should a leak occur in the region of the inlet orifice 28, air will flow into the collecting vessel 26 from outside, since a particular vacuum prevails in the collecting vessel 26 by virtue of the suction extraction device 31. Deposits can therefore in no way pass into the space 10 of the heat exchanger 2 through such a leak point.

Figure 3:
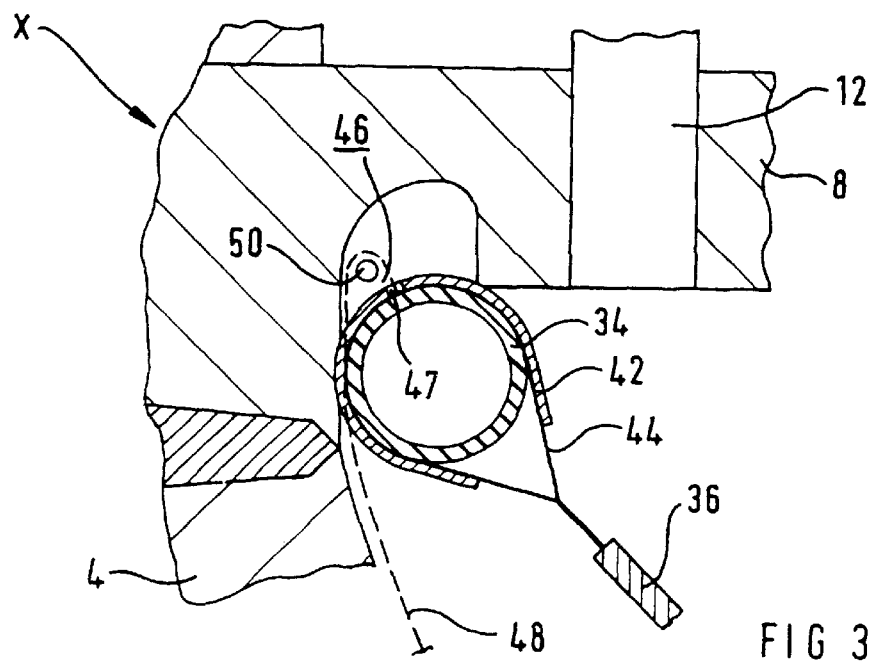
FIG. 3 is an enlarged, fragmentary, longitudinal-sectional view of a supporting point indicated by a circle X in FIG. 1.

As is seen in FIG. 3, in the present case, the inlet orifice 28 is sealed off by a single sealing element which is constructed as an inflatable hose 34 retained on the edge of the collecting vessel 26. Rubber seals or springs, which press the collecting vessel 26 against the tube plate 8, may also be used as sealing elements. For example, helical annular springs are suitable for this purpose. Alternatively, the inlet orifice 28 may also be sealed off by a combination of various sealing elements.

A shaking device 38 is provided in the vicinity of the oblique wall 36 of the collecting vessel 26. This device exerts a force on the wall 36 as required, for example with the aid of a ram 39, and sets the wall 36 in vibration. Deposits adhering to the wall 26 are thereby released and transported in the direction of the suction extraction orifice 32, so that caking or clogging of the collecting vessel 26 is avoided. The shaking device 38 may alternatively also be mounted at the suction extraction orifice 32.

The collecting vessel 26 is constructed in such a way that it can be folded, laid or rolled together in a small space. For this purpose, the side parts 37 are linked to one another, for example through a flexible connection, or the collecting vessel 26 is formed as a whole of a flexible material. Metal, plastic, textile fabric or rubber are suitable as the material. A collecting vessel 26 of this kind, which is not stretched out, can be introduced without much effort through the service orifice 6 into the half space 20B. The collecting vessel 26 is only deployed to its full size there.

FIG. 2 shows the separation of the lower space 10 into the inflow or entry-side half space 20A and the outflow or exit-side half space 20B, which is caused by the separating device 18.

It becomes clear from the illustration on the side of the exit-side half space 20B, that the inlet orifice 28 of the collecting vessel 26 surrounds the entire semicircularly constructed area of the half space 20B. The edge of the inlet orifice 28 is adapted to this semicircular geometry and the edge seals off the collecting vessel 26. For this purpose, the edge has the at least one sealing element. The inflatable hose 34, which was already mentioned, is preferably used for sealing. The hose 34 preferably runs completely around the inlet orifice 28 and is constructed in the manner of a fireman's hose. In order to fasten the collecting vessel 26, it is sufficient if the hose 34, which is firmly connected to the edge of the inlet orifice 28, is held through the use of the holding devices 30 at only a few points. During mounting, the hose 34 is initially clamped into the holding devices 30 or stapled to them at these points. The hose 34 is subsequently inflated. At the same time, it is adapted automatically to the geometry of the half space 20B and sealingly closes off the collecting vessel 36 relative to the tube plate 8.

The region indicated by a circle X, together with the holding device 30 of FIG. 1, is illustrated on an enlarged scale in FIG. 3. According to FIG. 3, a clamp 42 is fastened at an edge at which the tube plate 8 and the bottom 4 of the heat exchanger 2 meet. The sealing element, that is to say, in particular, the hose 34 or an annular spring, can be clamped into the clamp 42. A loop 44 which is formed, for example, of an elastic, in particular rubberized, fabric is led around the hose 34. This loop 44 is connected to the edge of the wall 36 of the collecting vessel 26 or merges into the edge. In order to protect the loop 44 and the hose 34, the clamp 42 may be provided on its inside with a non-illustrated friction protection. The friction protection is formed, for example, of foam or rubber and runs between the clamp 42 and the loop 44 or the hose 34.

FIG. 3 additionally outlines a positioning device 46 of simple construction which makes it possible to position the collecting vessel 26, without operating personnel having to enter the space 20B of the heat exchanger 2. The positioning device 46 includes a recess or clearance 47 in the clamp 42. A rope 48, which is illustrated by broken lines, is led through the recess or clearance 47. The rope 48 is led to the service orifice 6 through a deflecting roller 50 of the positioning device 46. When the collecting vessel 26 is being introduced into the heat exchanger 2, one end of the rope 48 is connected to the hose 34, for example through a hook connection. The hose 34 and the collecting vessel 26 can be introduced into the clamp 42 from outside the heat exchanger 2 and thus positioned by a pull on the other end of the rope 48. A positioning device 46 of this type is preferably provided on a plurality of or all of the holding devices 30.

In an alternative preferred embodiment, a non-illustrated rod assembly is used as the positioning device 46. This rod assembly has a number of preferably telescopic rods, with the aid of which the collecting vessel 26 is stretched out in the heat exchanger 2. The collecting vessel 26 is pressed against the tube plate 8 and retained with the aid of the individual extendible and telescopic rods. At the same time, the rods are supported on the heat exchanger 2, for example in the vicinity of the service orifice 6. The rod assembly is therefore clamped between the tube plate 8 and the inner wall surface of the heat exchanger 2 in the vicinity of the service orifice 6 as a result of an extension or retraction of the telescopic rods.

The collecting vessel 26 is distinguished by the fact that it is constructed so as to be capable of being folded together for simple and rapid mounting, and by the fact that, in the mounted state, it preferably covers the entire tube plate 8 in the half space 20B. During mounting, the collecting vessel 26, while being folded together, is initially introduced through the service orifice 6 into the heat exchanger 2, is deployed there, is fastened to the tube plate 8 and is sealed off relative to the environment as a result of the inflation of the hose 34. The actual cleaning work can then be started.

We claim:

1. In a method for cleaning heat exchange tubes led through a tube plate of a heat exchanger in a nuclear plant, the improvement which comprises:
   introducing a common collecting vessel through a service orifice into the heat exchanger and deploying the collecting vessel in the heat exchanger to a desired size and shape;
   mounting the common collecting vessel on the tube plate of the heat exchanger in the nuclear plant from below in the vicinity of the heat exchange tubes;
   releasing deposits in the heat exchange tubes and conveying the deposits to tube ends of the heat exchange tubes; and
   collecting the deposits from a plurality of the heat exchange tubes in the collecting vessel, without the collecting vessel changing position.

2. The method according to claim 1, which comprises extending an inlet orifice of the collecting vessel in a half space of the heat exchanger in the vicinity of the tube plate, over an entire underside of the tube plate in the half space.

3. The method according to claim 1, which comprises sealing off the collecting vessel relative to the surroundings.

4. The method according to claim 1, which comprises sealing off the collecting vessel at its edge, relative to the surroundings.

5. The method according to claim 1, which comprises positioning the collecting vessel with a positioning device.

6. The method according to claim 1, which comprises suction-extracting the released deposits from the collecting vessel.

7. In a method for cleaning heat exchange tubes led through a tube plate of a heat exchanger in a nuclear plant, the improvement which comprises:
   mounting a common collecting vessel on the tube plate of the heat exchanger in the nuclear plant from below in the vicinity of the heat exchange tubes;
   at least partially adapting the inlet orifice of the collecting vessel to a predetermined geometry and sealing off the inlet orifice relative to the environment, by the inflation of a hose;
   releasing deposits in the heat exchange tubes and conveying the deposits to tube ends of the heat exchange tubes; and
   collecting the deposits from a plurality of the heat exchange tubes in the collecting vessel, without the collecting vessel changing position.

8. The method according to claim 7, which comprises carrying out the adapting step by adapting the inlet orifice of the collecting vessel to a geometry of a half space of the heat exchanger in the vicinity of the tube plate.

9. The method according to claim 7, which comprises extending an inlet orifice of the collecting vessel in a half space of the heat exchanger in the vicinity of the tube plate, over an entire underside of the tube plate in the half space.

10. The method according to claim 7, which comprises sealing off the collecting vessel relative to the surroundings.

11. The method according to claim 7, which comprises sealing off the collecting vessel at its edge, relative to the surroundings.

12. The method according to claim 7, which comprises positioning the collecting vessel with a positioning device.

13. The method according to claim 7, which comprises suction-extracting the released deposits from the collecting vessel.

14. In a heat exchanger in a nuclear plant, the heat exchanger including a tube plate and heat exchange tubes led through the tube plate and having tube ends, a collecting device for collecting deposits from the heat exchange tubes, the collecting device comprising:

a collecting vessel to be mounted below the tube plate of the heat exchanger in the nuclear plant, said collecting vessel having an inlet orifice enclosing a plurality of the tube ends; and said collecting vessel has an inflatable hose at least partially around said inlet orifice.

15. The collecting device according to claim 14, wherein said collecting vessel is mounted on the tube plate from below.

16. The collecting device according to claims 14, wherein said collecting vessel is a funnel.

17. The collecting device according to claim 14, wherein said collecting vessel is fastened and sealingly closed off relative to the surroundings.

18. The collecting device according to claim 14, wherein at least a partial region of said collecting vessel is formed of flexible material.

19. The collecting device according to claim 14, including a suction extraction device disposed on said collecting vessel.

20. The collecting device according to claim 14, including a positioning device for positioning said collecting vessel.

21. The collecting device according to claim 14, including a plurality of holding devices for fastening said collecting vessel to said tube plate from below.

22. The collecting device according to claim 14, including clamps disposed in the vicinity of the underside of the tube plate, for clamping said hose in said clamps.

23. The collecting device according to claim 14, including a manipulator for releasing the deposits.

24. In a heat exchanger having heat exchange tubes, a collecting vessel for collecting deposits from the heat exchange tubes, the collecting vessel comprising:

a conical and foldable structure having an inlet orifice, and an inflatable hose at said inlet orifice.

25. The collecting device according to claim 24, wherein said inlet orifice has an edge, and said inflatable hose runs entirely around said edge.

26. In a heat exchanger in a nuclear plant, the heat exchanger including a tube plate and heat exchange tubes led through the tube plate and having tube ends, a collecting device for collecting deposits from the heat exchange tubes, the collecting device comprising:

a collecting vessel to be mounted below the tube plate of the heat exchanger in the nuclear plant, said collecting vessel having an inlet orifice enclosing a plurality of the tube ends; and said collecting vessel can be folded together.

27. The collecting device according to claim 26, wherein said collecting vessel is mounted on the tube plate from below.

28. The collecting device according to claim 26, wherein said collecting vessel is a funnel.

29. The collecting device according to claim 26, wherein said collecting vessel is fastened and sealingly closed off relative to the surroundings.

30. The collecting device according to claim 26, wherein at least a partial region of said collecting vessel is formed of flexible material.

31. The collecting device according to claim 26, including a suction extraction device disposed on said collecting vessel.

32. The collecting device according to claim 26, including a positioning device for positioning said collecting vessel.

33. The collecting device according to claim 26, including a plurality of holding devices for fastening said collecting vessel to said tube plate from below.

34. The collecting device according to claim 26, including a manipulator for releasing the deposits.

35. In a heat exchanger in a nuclear plant, the heat exchanger including a tube plate and heat exchange tubes led through the tube plate and having tube ends, a collecting device for collecting deposits from the heat exchange tubes, the collecting device comprising:

a collecting vessel to be mounted below the tube plate of the heat exchanger in the nuclear plant, said collecting vessel having an inlet orifice enclosing a plurality of the tube ends; and a shaking device connected to said collecting vessel.

36. The collecting device according to claim 35, wherein said collecting vessel is mounted on the tube plate from below.

37. The collecting device according to claim 35, wherein said collecting vessel is a funnel.

38. The collecting device according to claim 35, wherein said collecting vessel is fastened and sealingly closed off relative to the surroundings.

39. The collecting device according to claim 35, wherein at least a partial region of said collecting vessel is formed of flexible material.

40. The collecting device according to claim 35, including a suction extraction device disposed on said collecting vessel.

41. The collecting device according to claim 35, including a positioning device for positioning said collecting vessel.

42. The collecting device according to claim 35, including a plurality of holding devices for fastening said collecting vessel to said tube plate from below.

43. The collecting device according to claim 35, including a manipulator for releasing the deposits.

* * * * *